(12) United States Patent
Sugiura (10) Patent No.: US 12,005,569 B2
(45) Date of Patent: Jun. 11, 2024

(54) MOISTURE INTRUSION DETECTION SYSTEM AND MOISTURE INTRUSION DETECTION METHOD

(71) Applicant: OKUMA Corporation, Aichi (JP)

(72) Inventor: Hiroyuki Sugiura, Aichi (JP)

(73) Assignee: OKUMA CORPORATION, Aichi (JP)

(*) Notice: Subject to any disclaimer, the term of this patent is extended or adjusted under 35 U.S.C. 154(b) by 1119 days.

(21) Appl. No.: 16/824,738

(22) Filed: Mar. 20, 2020

(65) Prior Publication Data

US 2020/0298418 A1 Sep. 24, 2020

(30) Foreign Application Priority Data

Mar. 22, 2019 (JP) ................................ 2019-055377

(51) Int. Cl.
 *B25J 13/08* (2006.01)
 *B25J 17/02* (2006.01)
 *B25J 19/02* (2006.01)
 *G01N 27/60* (2006.01)

(52) U.S. Cl.
 CPC ............ *B25J 13/087* (2013.01); *B25J 17/02* (2013.01); *B25J 19/02* (2013.01); *G01N 27/605* (2013.01)

(58) Field of Classification Search
 None
 See application file for complete search history.

(56) References Cited

U.S. PATENT DOCUMENTS

| 2005/0184130 | A1 | 8/2005 | Yoneda et al. |
| 2010/0043587 | A1* | 2/2010 | Broberg ............... B25J 19/0016 901/19 |
| 2018/0047602 | A1* | 2/2018 | Kawai ............... H01L 21/67775 |
| 2018/0286726 | A1 | 10/2018 | Rebstock |
| 2020/0238534 | A1* | 7/2020 | Goldberg ............... B25J 9/0093 |

FOREIGN PATENT DOCUMENTS

| JP | S61121895 A | 6/1986 |
| JP | S63237889 A | 10/1988 |
| JP | 07246587 A | 9/1995 |

(Continued)

OTHER PUBLICATIONS

JPO Notice of Reasons for Refusal corresponding to JP Application No. 2019-055377; dated Aug. 9, 2022.

*Primary Examiner* — Jermele M Hollington
*Assistant Examiner* — Carl F. R. Tchatchouang
(74) *Attorney, Agent, or Firm* — CANTOR COLBURN LLP (57) ABSTRACT

A moisture intrusion detection system includes: an industrial robot that has a closed space defined thereinside; an air supply mechanism that supplies compressed air to the closed space; an air vent passage that is provided in the industrial robot to establish communication between an external space outside the industrial robot and the closed space, and guides, to the external space, air ejected from the closed space upon supply of the compressed air; a humidity sensor that detects a humidity of ejected air that is ejected from the air vent passage to the external space upon supply of the compressed air; and a controller that determines presence or absence of moisture intruding into the closed space based on a detected humidity of the ejected air, the detected humidity being detected by the humidity sensor.

9 Claims, 5 Drawing Sheets

(56) References Cited

FOREIGN PATENT DOCUMENTS

| | | | |
|---|---|---|---|
| JP | H10180678 A | * | 7/1998 |
| JP | 2005205576 A | | 8/2005 |
| JP | 2008012601 A | | 1/2008 |
| JP | 2008307637 A | | 12/2008 |
| JP | 4283549 B2 | | 6/2009 |
| JP | 2009224514 A | | 10/2009 |
| JP | 2013188806 A | | 9/2013 |
| JP | 5939199 B2 | | 6/2016 |
| JP | 2018536984 A | | 12/2018 |

* cited by examiner

MOISTURE INTRUSION DETECTION SYSTEM AND MOISTURE INTRUSION DETECTION METHOD

CROSS REFERENCE TO RELATED APPLICATION

This present invention claims priority under 35 U.S.C. § 119 to Japanese Patent Application No. 2019-055377 filed on Mar. 22, 2019, the entire content of which is incorporated herein by reference.

TECHNICAL FIELD

This specification discloses a moisture intrusion detection system and a moisture intrusion detection method for detecting the presence or absence of moisture that has intruded into a closed space provided inside an industrial robot.

BACKGROUND

In recent years, industrial robots have been heavily used in various fields. Such industrial robots may be used in an environment where they are likely to come into contact with water or where the humidity level is high. An industrial robot is usually sealed so that moisture does not enter the inside of the industrial robot even in such an environment. However, moisture may enter the industrial robot through a small gap. If the industrial robot is left with moisture inside it, various problems occur such as electric leakage and poor lubrication of gears provided inside the industrial robot. Therefore, in order to avoid such a problem, a system that can accurately detect intrusion of moisture into the inside of the industrial robot is required.

Patent Documents 1 and 2 disclose techniques for detecting moisture that has intruded into the inside of a device. JP 5939199 B discloses a motor in which a water immersion sensor having a pair of electrodes is installed in a motor case. The immersion sensor determines the presence or absence of moisture based on the electrical resistance between the pair of electrodes.

JP 4283549 B discloses a technique in which a submerged electric pump is provided with a water intrusion chamber that easily accumulates intruding water, and a water intrusion detection sensor is installed in the water intrusion chamber.

Furthermore, JP 2013-188806 A discloses a technique for detecting moisture contained in air. Specifically, JP 2013-188806 A discloses a cutting apparatus including a spindle shaft, an air bearing that rotatably supports the spindle shaft, an air supply path that supplies high-pressure air to the air bearing, and a moisture detection unit that detects moisture in high-pressure air supplied from an air supply source to the air bearing. The moisture detection unit includes a moisture adsorbing unit that changes in color by adsorbing moisture, and a discoloration detection sensor that detects a color change of the moisture adsorbing unit.

However, in the technique disclosed in JP 5939199 B, water must be present between the pair of electrodes, and only moisture near the sensor can be detected. This problem can be alleviated to some extent by providing a water intrusion chamber that easily accumulates water as in JP 4283549 B. However, it has been difficult to provide a space such as the water intrusion chamber of JP 4283549 B inside an industrial robot whose posture changes in a complicated manner. JP 2013-188806 A discloses a moisture detection technique that does not use a pair of electrodes. However, the technique disclosed in JP 2013-188806 A only detects moisture in high-pressure air output from an air supply source, and is not a technique for detecting the presence or absence of moisture inside a device (spindle shaft or air bearing).

In other words, there has been no technique that can accurately detect the presence or absence of moisture that has intruded into the inside of an industrial robot. The present specification therefore discloses a moisture intrusion detection system and a moisture intrusion detection method that can accurately detect moisture that has intruded into the inside of an industrial robot.

SUMMARY

A moisture intrusion detection system disclosed in this specification includes: an industrial robot that has a closed space defined thereinside; an air supply mechanism that supplies compressed air to the closed space; an air vent passage that is provided in the industrial robot to establish communication between an external space outside the industrial robot and the closed space, and guides air ejected from the closed space upon supply of the compressed air, to the external space; a humidity sensor that detects a humidity of ejected air that is ejected from the air vent passage to the external space upon supply of the compressed air; and a controller that determines presence or absence of moisture intruding into the closed space based on a detected humidity of the ejected air, the detected humidity being detected by the humidity sensor.

In this case, the air supply mechanism may include: a supply source of the compressed air; an air hose that communicates with the supply source and through which the compressed air flows; and a connector that is provided to the industrial robot and to which the air hose is detachably attached, the connector communicating with the closed space.

The air supply mechanism may further include an internal hose that is disposed in the closed space, has one end connected to the connector, and has one or more outlets that discharge the compressed air to the closed space.

The air supply mechanism may discharge the compressed air at more than one point in the closed space.

The industrial robot may be a multi joint robot that includes a plurality of arms coupled via a joint and is provided with a mechanical interface including a distal end to which a tool is detachably attachable, and the air supply mechanism may discharge the compressed air to at least one of a spot near the joint and a spot near the distal end.

In this case, the air supply mechanism may discharge the compressed air to a spot near the distal end, and the air vent passage may be provided near a proximal end of the industrial robot.

The controller may cause the air supply mechanism to continue to supply the compressed air for at least a predetermined reference time, and determine presence or absence of moisture intruding into the closed space according to a detected humidity that is detected at a determination timing after a lapse of at least the reference time from the start of the supply of the compressed air, and the reference time may be the time during which the supplied compressed air passes through the closed space and is then output from the air vent passage.

A moisture intrusion detection method disclosed in this specification includes: supplying compressed air to a closed space provided inside an industrial robot; detecting, with a humidity sensor, a humidity of ejected air that is ejected from an air vent passage upon supply of the compressed air, the air vent passage being provided in the industrial robot; and determining, by means of a controller, presence or absence of moisture intruding into the closed space, according to the humidity detected by the humidity sensor.

According to the moisture intrusion detection system and the moisture intrusion detection method disclosed in this specification, the presence or absence of moisture in the air path in the closed space is reflected in the humidity of the ejected air. Consequently, the presence or absence of moisture can be detected in a very wide area of the air path. As a result, even moisture that has intruded into the inside of a complicated structure, such as an industrial robot, can be accurately detected.

BRIEF DESCRIPTION OF DRAWINGS

Embodiment(s) of the present disclosure will be described based on the following figures, wherein.

DESCRIPTION OF EMBODIMENTS

Figure 1:
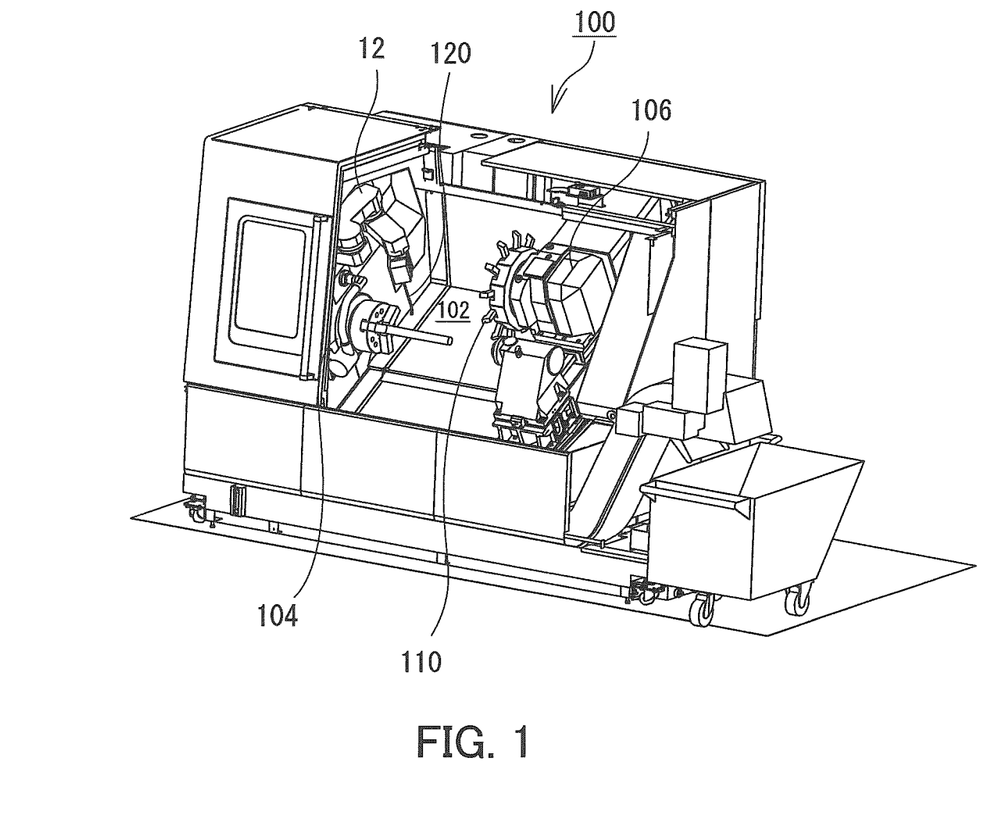
FIG. 1 is a perspective view of a machine tool in which a moisture intrusion detection system is incorporated.
Figure 2:
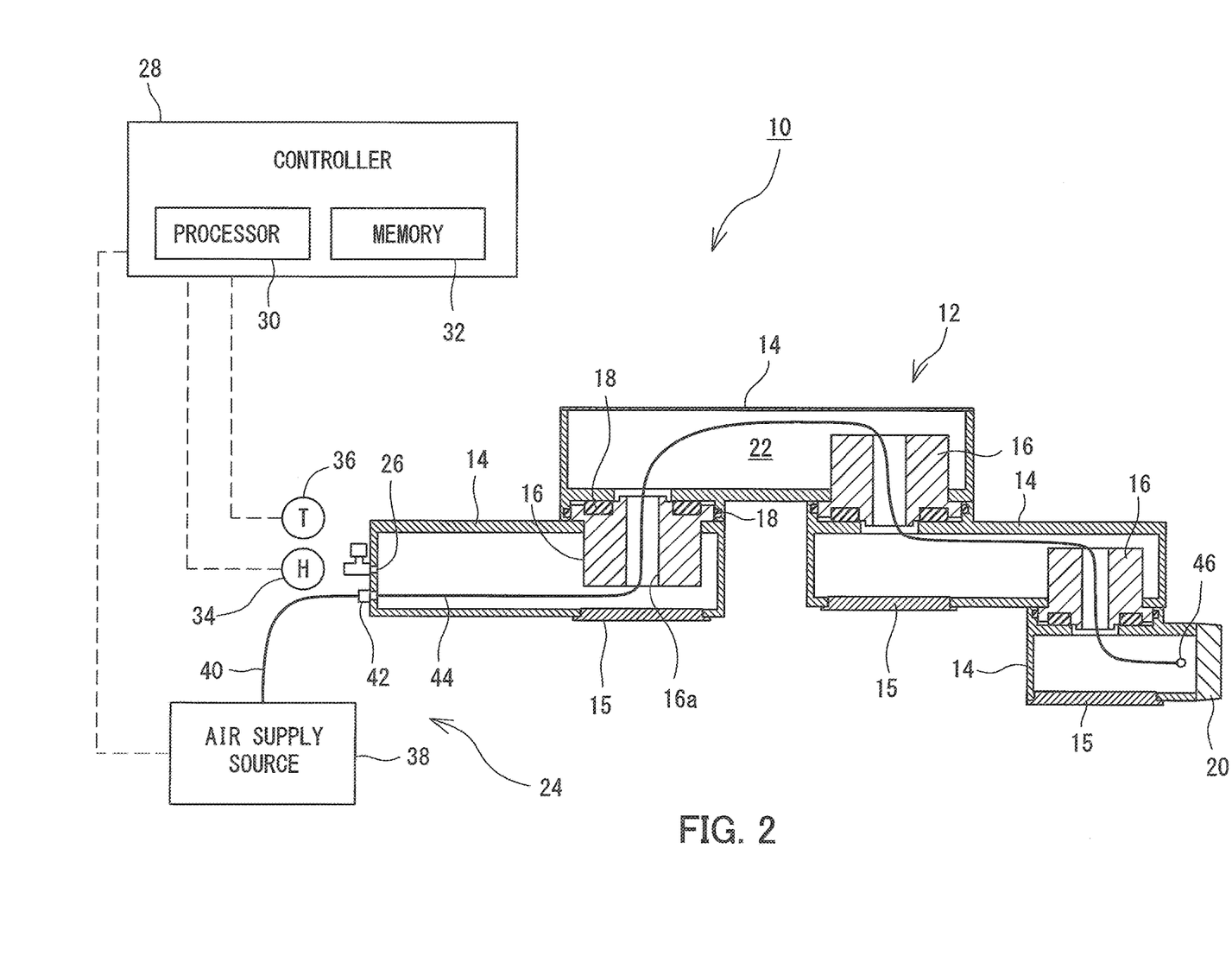
FIG. 2 is a diagram showing the configuration of the moisture intrusion detection system.

The configuration of a moisture intrusion detection system of an embodiment will now be described with reference to the accompanying drawings. FIG. 1 is a perspective view of a machine tool 100 in which a moisture intrusion detection system 10 is incorporated. FIG. 2 is a diagram showing the configuration of the moisture intrusion detection system 10.

The moisture intrusion detection system 10 detects the presence or absence of moisture that has intruded into an industrial robot 12. As shown in FIG. 2, the moisture intrusion detection system 10 includes the industrial robot 12 containing a closed space 22.

The industrial robot 12 is a robot used for industrial automation. Such an industrial robot 12 is typically a robot that is automatically controlled and reprogrammable, is a versatile manipulator, can be programmed with respect to three or more degrees of freedom, and is fixed at one point or is movable. A robot refers to a motion mechanism that operates according to a program, has a certain degree of autonomy, and operates in an environment to execute a predetermined task.

In this specification, as shown in FIG. 2, the industrial robot 12 is a multi joint robot having a plurality of arms 14 coupled via joints 16. However, the industrial robot 12 can be anything that contains a closed space 22. For this reason, the industrial robot 12 may be, for example, a rectangular coordinate robot, a parallel link robot, or a pendulum robot.

As shown in FIG. 1, the industrial robot 12 of this example is installed in a processing room 102 of the machine tool 100. The machine tool 100 is a cutting machine (metal processing machine) for cutting a metal material using a cutting tool 110. To be specific, the machine tool 100 is a lathe device for turning and cutting a workpiece held and rotated by a spindle device 104, using the cutting tool 110 held by a tool post 106. The industrial robot 12 is installed in the processing room 102 of such a machine tool 100, and carries out processing for transporting a workpiece or a tool, processing for assisting cutting (for example, holding a workpiece during processing), processing for sensing various physical quantities, and processing for cleaning various parts.

The aforementioned installation position and processing of the industrial robot 12 are merely illustrative, and may be changed as appropriate. Therefore, the industrial robot 12 is not limited to a lathe device, and may be incorporated in another machine tool such as a press machine, a polishing machine, an electrical discharge machine, or a laser machine. Similarly, the industrial robot 12 is not limited to a machine tool, and may be incorporated in another mechanical device, such as a welding device or a coating device. Similarly, the industrial robot 12 may be used alone without being incorporated in another mechanical device. Therefore, the industrial robot 12 may be an assembly robot that assembles parts, an inspection robot that inspects dimensions or the like of an object, a transport robot that transports various articles, or the like.

As shown in FIG. 2, the industrial robot 12 is a multi joint robot having a plurality of (four in the given example) arms 14 coupled via joints 16 as described above. Each arm 14 is a hollow cylindrical member. A lid 15 provided with packing or sealing is attached to the opening of each arm 14 to ensure the hermeticity of the internal space of the arm 14. An arm 14 is coupled to an end of another arm 14 via a joint 16. A sealing member 18 is provided at a joint between each joint 16 and the arm 14, ensuring the hermeticity of the closed space 22. The joints 16 have through holes 16a through which the two arms 14 communicate with each other, so that the internal spaces of the plurality of arms 14 communicate with each other. In other words, the internal spaces of the plurality of arms 14 are connected, forming the single closed space 22 extending from the vicinity of the proximal end to the vicinity of the distal end of the industrial robot 12.

Each joint 16 is provided with a joint member (not shown in the drawings) that allows the arm 14 to move. Such a joint member may be, for example, a rectilinear joint member that enables relative rectilinear movement of the two arms 14, a rotary joint member that enables relative rotational movement of the two arms 14, a sphere joint member that enables relative rotational movement of three degrees of freedom around the fixed point of the two arms 14, or the like. A power source for moving the arms 14, a transmission component for transmitting the motion of the power source to the arms 14, and a sensor (none of which are shown in the drawings) for measuring the amount of movement of the arms 14 are provided in the vicinity of each joint member. The power source may be a motor or an electromagnetic cylinder that operates with electric power, or a hydraulic or pneumatic cylinder that operates with hydraulic pressure or pneumatic pressure. Further, a gear, a rack, or the like may be used as the transmission component. An encoder, a resolver, or the like may be used as the sensor.

A mechanical interface 20 to which an end effector 120 (see FIG. 1, not shown in FIG. 2) is detachably attached is provided at the distal end of the industrial robot 12. During use, the end effector 120 is attached to the mechanical interface 20 so that the industrial robot 12 can perform a task. The end effector 120 may be, for example, a holder device (for example, a hand mechanism or a suction mechanism) for holding an article, a sensor for measuring any of various physical quantities, a processing device for performing any of various processing operations (for example, a spray gun, a welding gun, or a screwdriver), a discharge nozzle for discharging liquid, and the like. An electric cable for supplying power to and exchanging a control signal with the end effector may be passed outside the industrial robot 12 or may be passed inside the closed space 22. In addition, electronic components such as a power source and a sensor are built in the closed space 22. An electric cable (not shown in the drawings) for supplying power to and exchanging a control signal with the electronic components is passed through the closed space 22.

Here, as is clear from the above description, the closed space 22 inside the industrial robot 12 contains electronic components such as a motor and a sensor, electric cables for power supply and signal exchange, and the like. The closed space 22 is also provided with gears and racks for transmitting power. When moisture enters the closed space 22, various problems occur, such as a failure in electronic components, electric leakage, and poor lubrication of gears. To avoid these problems, in the case of the industrial robot 12 that is usually used in an environment with a lot of moisture, the sealing member 18 is provided at joints and the like, so that its internal space is closed liquid-tightly.

However, such a sealing member 18 may gradually deteriorate due to aging or the influence of chemicals, with its sealing property degrading. Aside from that, depending on the use environment of the industrial robot 12, water may be injected at a high pressure, and moisture may go beyond the sealing portion and enter the closed space 22. For example, in the machine tool 100, cutting water, which is used to cool the workpiece and the cutting tool 110 and blow off swarf, may be sprayed during cutting. Since such cutting water is injected at a relatively high pressure, if the industrial robot 12 is located near the injection position, the cutting water may go beyond the sealing portion and enter the closed space 22. If such intrusion of moisture is neglected for a long period of time, as described above, problems occur, such as a failure in electronic components, poor lubrication of transmission components, and electric leakage occur.

The moisture intrusion detection system 10 detects the presence or absence of such moisture intrusion and further includes, in addition to the industrial robot 12, an air supply mechanism 24, an air vent passage 26, a humidity sensor 34, a temperature sensor 36, and a controller 28. The air supply mechanism 24 supplies compressed air to the closed space 22. Specifically, the air supply mechanism 24 has an air supply source 38 serving as a source of compressed air. The air supply source 38 outputs compressed air. The humidity of the compressed air output from the air supply source 38 is known. The compressed air may be dry air with a humidity lower than that of the atmosphere. The humidity of the dry air at a temperature of 10 to 35° C. and atmospheric pressure may be 15% or less, and may be 11% or less, and may be 8% or less. Accordingly, the air supply source 38 has, for example, a compressor and an air dryer. The air dryer may have any configuration that can keep the humidity of the output air constant. For this reason, the air dryer may be, for example, a membrane air dryer, a refrigeration air dryer, a membrane type air dryer, or the like.

An air hose 40 through which compressed air flows is connected to the air supply source 38. The industrial robot 12 is provided with a connector 42 connected to the other end of the air hose 40. The connector 42 is a connector to which the air hose 40 is detachably attached and communicates with the closed space 22. Although the connector 42 may have any shape and be located anywhere, the connector 42 usually has a hole that passes through the housing of the arm 14 (the housing of the industrial robot 12). In the example shown in FIG. 2, the connector 42 is formed on the most proximal arm 14. This is because moisture (cutting water) is less likely to be applied to a proximal end than to a distal end, and when the connector 42 is provided on the proximal end, moisture intrusion through the connector 42 does not easily occur. The connector 42 may have a lid (not shown in the drawings) that closes the opening of the connector 42 to prevent intrusion of moisture or dust via the connector 42 upon detachment of the air hose 40. Alternatively, the connector 42 may be a fluid coupler having an automatic switching valve that opens only when connecting to an end of the air hose 40.

An internal hose 44 connected to the connector 42 is routed in the closed space 22. The compressed air supplied from the air supply source 38 flows to the internal hose 44 via the air hose 40 and the connector 42. The internal hose 44 has an outlet 46 through which the compressed air is discharged into the closed space 22. Although the outlet 46 may be located at any position, in the example shown in FIG. 2, the outlet 46 is provided near the distal end.

The air hose 40 and the internal hose 44 may have any material and size that can guide compressed air. However, the internal hose 44, which is expected to be close to other members, such as electronic components, in the closed space 22, must have sufficient heat resistance and insulation. It is also expected that the internal hose 44 routed into the closed space 22 is relaxed or tensioned with the change of the posture of the industrial robot 12. Accordingly, a tension reel (not shown in the drawings) for keeping the tension of the internal hose 44 constant using an urging member, such as a spring, may be provided in the closed space 22.

The industrial robot 12 further includes the air vent passage 26. The air vent passage 26 is a through hole for communication between the external space outside the industrial robot 12 and the closed space 22 and is provided in the housing of the industrial robot 12. Upon the release of the compressed air into the closed space 22, the air vent passage 26 guides the air ejected from the closed space 22 to the external space. The air vent passage 26 may be made in any form and located at any position. In the example shown in FIG. 2, the air vent passage 26 is formed near the arm 14 adjacent to the most proximal end; that is, near the end of the closed space 22 remote from the outlet 46. With the air vent passage 26 near the proximal end where moisture is less likely to be applied, intrusion of moisture through the air vent passage 26 can be suppressed. In order to avoid moisture and dust intrusion through the air vent passage 26, a lid or a throttle for opening and closing the air vent passage 26 may be provided. With the air vent passage 26 near the opposite end of the outlet 46, an airflow generated by the supply of the compressed air flows through the entire closed space 22 as described later. Thus, the presence or absence of intruding moisture can be diagnosed throughout the closed space 22, which will be described later.

The humidity sensor 34 and the temperature sensor 36 for measuring the humidity and temperature of the ejected air output from the air vent passage 26 are provided outside the industrial robot 12 and near the air vent passage 26. The humidity sensor 34 may be, for example, a resistive humidity sensor that outputs humidity based on the electric resistance between two electrodes, or a capacitive humidity sensor that outputs humidity based on the capacitance between two electrodes. The temperature sensor 36 may be any sensor such as a thermistor, a thermocouple, an infrared sensor, or a digital sensor. In any case, the results of detection by the humidity sensor 34 and the temperature sensor 36 are sent to the controller 28 as needed.

The controller 28 controls the operation of the air supply mechanism 24 and determines the presence or absence of moisture that has intruded into the closed space 22, according to the humidity and the like detected by the humidity sensor 34. The controller 28 is, for example, a computer having a processor 30, such as a CPU, and a memory 32 for storing various data and programs. The controller 28 may be a computer dedicated to the moisture intrusion detection system 10 or a computer also used for other purposes. For example, the controller 28 may be a computer for controlling the operation of the industrial robot 12 or a numerical control device mounted on the machine tool 100.

The controller 28 drives the air supply source 38 as needed to supply compressed air to the closed space 22 and, at this time, acquires the humidity and temperature detected by the humidity sensor 34 and the temperature sensor 36. The presence or absence of intruding moisture is determined according to the detected humidity and temperature.

The principle of moisture intrusion detection using the moisture intrusion detection system 10 will now be described. As described above, to determine the presence or absence of intruding moisture, the compressed air is supplied to the closed space 22 through the air supply mechanism 24. The closed space 22, excluding the connector 42 and the air vent passage 26, is liquid-tightly closed. Consequently, when the compressed air is discharged from the outlet 46, a flow of air from the outlet 46 to the air vent passage 26; that is, an air flow, is generated. If moisture exists in the airflow path, part of the moisture dissolves in the air, and the humidity of the air ejected from the air vent passage 26 increases. In particular, when the compressed air discharged into the closed space 22 is dry air having low humidity, the moisture easily disperses. Hence, when dry air is used as the compressed air, the humidity of the ejected air changes significantly depending on the presence or absence of moisture in the airflow path. Therefore, the presence or absence of intruding moisture can be determined by monitoring the humidity of the ejected air.

The flow of the moisture intrusion detection process will be described in detail. To detect the presence or absence of intruding moisture, first, the air hose 40 is attached to the connector 42 to establish communication between the air supply source 38 and the outlet 46. If a lid or the like is provided to the air vent passage 26, it is detached to leave the air vent passage 26 open.

In this state, the controller 28 drives the air supply source 38 to supply compressed air to the closed space 22. The humidity of the compressed air (hereinafter referred to as "reference humidity Hd") is kept substantially constant by the air supply source 38. The controller 28 retains the reference humidity Hd in advance. The supply of the compressed air is continued, for example, for at least a reference time in which the compressed air output from the outlet 46 is ejected from the air vent passage 26. Consequently, for example, the supply of compressed air is continued until the volume of the compressed air discharged from the outlet 46 reaches the capacity of the closed space 22.

Upon the start of the supply of compressed air, the air ejected from the closed space 22 is output from the air vent passage 26. The humidity sensor 34 and the temperature sensor 36 measure the humidity and temperature of the ejected air. The measured humidity and temperature are sent to the controller 28 as a detected humidity Hm and a detected temperature Tm, respectively. The controller 28 stores the detected humidity Hm and the detected temperature Tm in its memory in association with the detection time.

Figure 3:
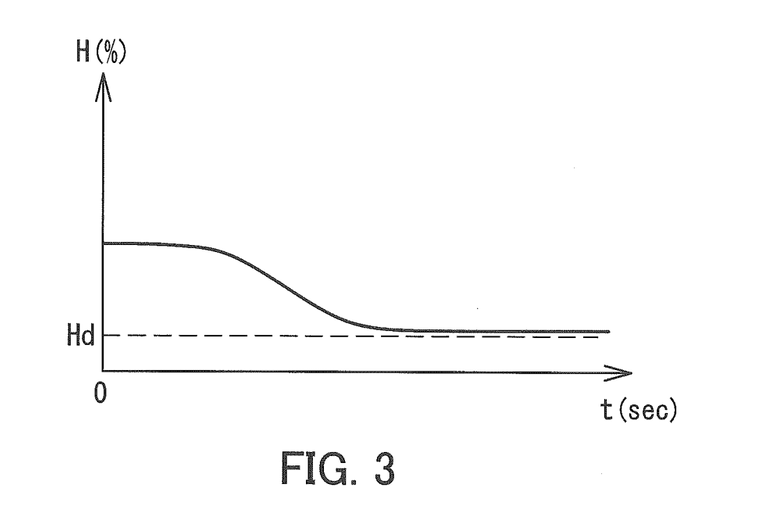
FIG. 3 is a diagram showing an example of a temporal change in detected humidity when there is no moisture intrusion.
Figure 4:
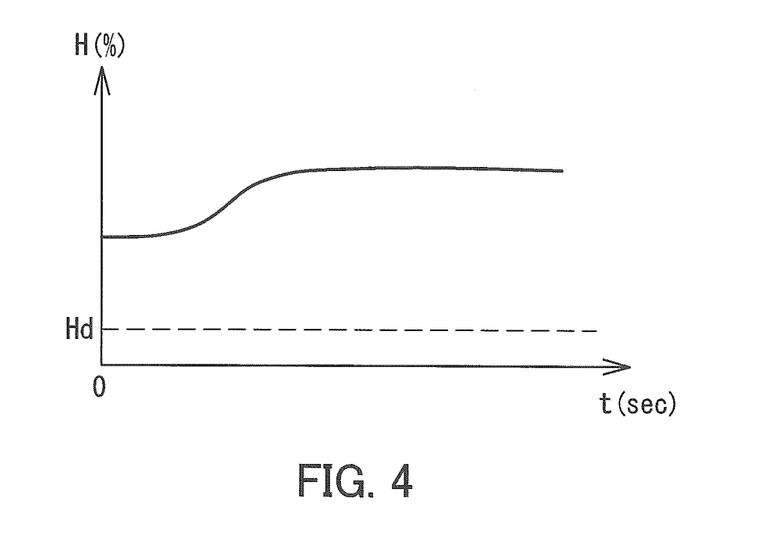
FIG. 4 is a diagram showing an example of a temporal change in detected humidity when there is moisture intrusion.

The controller 28 determines the presence or absence of intruding moisture based on at least the detected humidity Hm. In other words, when the detected humidity Hm is high, the controller 28 determines that moisture has intruded into the closed space 22. Although this determination may be made by any specific procedure, an example will be described with reference to FIGS. 3 and 4. FIGS. 3 and 4 are diagrams illustrating an example of a temporal change in the detected humidity Hm. FIG. 3 illustrates the case where moisture has not intruded, and FIG. 4 illustrates the case where moisture has intruded. In FIGS. 3 and 4, the horizontal axis represents time t, and the vertical axis represents humidity H. The dashed line indicates the reference humidity Hd which is the humidity of the compressed air. In this example, the compressed air is dry air having a lower humidity than the atmosphere.

As shown in FIG. 3, immediately after the supply of compressed air is started, the detected humidity Hm is sufficiently higher than the reference humidity Hd which is the humidity of the compressed air. This is because the air that is originally near the air vent passage 26 is ejected immediately after the start of supply of the compressed air. The air originally present in the closed space 22 has substantially the same humidity as the atmosphere regardless of the presence or absence of moisture, and is sufficiently higher in humidity than the reference humidity Hd.

If no moisture has intruded into the closed space 22, continuously supplying compressed air thereafter causes the detected humidity Hm to drop sharply and eventually reach a value close to the reference humidity Hd. This is because when a sufficient amount of compressed air is supplied, the compressed air discharged from the outlet 46 passes through the closed space 22 and is output from the air vent passage 26. If there is no moisture in the closed space 22, the compressed air discharged from the outlet 46 reaches the air vent passage 26 with little increase in humidity. As a result, the detected humidity Hm also becomes a value close to the reference humidity Hd.

In contrast, when moisture has intruded into the closed space 22, the detected humidity Hm rises rapidly in the middle as shown in FIG. 4. This is because when the compressed air discharged from the outlet 46 passes near the moisture, the moisture disperses in the compressed air and the humidity increases. The air in which moisture is dispersed is output from the air vent passage 26, so that the detected humidity Hm rises rapidly.

In other words, when moisture has intruded into the closed space 22, the detected humidity Hm increases after a certain period of time has elapsed from the start of the supply of the compressed air. Therefore, the controller 28 may compare the detected humidity Hm after the lapse of the certain period of time with a predetermined threshold and, if the detected humidity Hm is equal to or greater than the threshold, determine that moisture has intruded.

Note that the threshold is, of course, a value higher than the reference humidity Hd. This threshold may be a fixed value that is always constant, or a variable value that changes according to the ambient temperature or the like. As described above, the detected humidity Hm to be compared with the threshold is the detected humidity Hm observed after sufficient time has elapsed from the start of the supply of compressed air. The timing of when the detected humidity Hm used for determining the presence or absence of intruding moisture is detected will hereinafter be referred to as "determination timing". This determination timing is the timing of when sufficient time has elapsed from the start of the supply of compressed air; specifically, after the elapse of a time equal to or longer than the time required for air to reach the air vent passage 26 from the outlet 46. Such a determination timing can be predetermined according to the distance from the outlet 46 to the air vent passage 26, the flow rate of compressed air, the capacity of the closed space 22, and the like. This is not necessarily one determination timing, and there may be more than one determination timing. When there is more than one determination timing and more than one detected humidity Hm is obtained, a statistical value (average value, intermediate value, or the like) representing the detected humidity Hm may be compared with a threshold.

The presence or absence of moisture intrusion may be determined based on not the absolute value of the detected humidity Hm but the initial value of the detected humidity Hm, and the comparison result with the reference humidity Hd or the atmospheric humidity. In other words, the detected humidity Hm finally obtained fluctuates depending not only on the presence or absence of moisture but also on the humidity and temperature of the atmosphere. For example, in an environment where the atmospheric humidity is extremely high, the detected humidity Hm may be high even if no moisture has intruded into the closed space 22. In such a case, the presence or absence of moisture intrusion may be determined based on not the absolute value of the detected humidity Hm obtained with the determination timing, but a difference between the detected humidity Hm obtained with the determination timing and the atmospheric humidity or the detected humidity Hm obtained with the initial timing. Alternatively, the presence or absence of moisture intrusion may be determined based on a ratio (for example, detected humidity Hm/atmospheric humidity) instead of such a difference.

Alternatively, the presence or absence of moisture intrusion may be determined in consideration of not only the detected humidity Hm detected at the determination timing but also the detected temperature Tm. For example, if the temperature and the humidity are known, the amount of moisture in the air can be determined. Therefore, the amount of moisture contained in the ejected air may be calculated from the detected humidity Hm and the detected temperature Tm detected at the determination timing, and the amount of moisture may be compared with a predetermined threshold to determine the presence or absence of moisture intrusion.

In any case, the controller 28 determines the presence or absence of moisture intrusion by using the fact that the humidity of the ejected air is higher when moisture exists in the closed space 22 than when it does not exist there. If the presence or absence of moisture intrusion can be determined, then the operator can remove the air hose 40 from the connector 42. If it is determined that moisture has intruded, an internal component of the industrial robot 12 may be damaged or its life may be shortened. To avoid this, an alarm is output to prompt early repair.

As is clear from the above description, in this example, compressed air is supplied into the closed space 22, and the presence or absence of moisture intruding into the closed space 22 is determined based on the humidity of the air ejected upon the supply. With this configuration, it is possible to determine the presence or absence of moisture in a wide area from the outlet 46 to the air vent passage 26. In other words, if there is moisture in the path of the air from the outlet 46 to the air vent passage 26, the moisture is reflected in the humidity of the ejected air. Consequently, unlike in Patent Documents 1 and 2 in which a humidity sensor having a pair of electrodes is installed in a device, the presence or absence of moisture can be determined over a wider area. In particular, in the example shown in FIG. 2, the outlet 46 is provided near one end of the closed space 22, and the air vent passage 26 is provided near the other end of the closed space 22. Hence, the air discharged from the outlet 46 passes through substantially the entire closed space 22, so that the presence or absence of moisture in substantially the entire closed space 22 can be determined.

In addition, in this example, the humidity sensor 34 and the like are provided outside the industrial robot 12, so that the humidity sensor 34 is not provided in the closed space 22. This configuration eliminates the need to provide a space for installing the humidity sensor 34, thereby enabling a further reduction in size of the industrial robot 12. Moreover, in this example, with the internal hose 44 passing through the closed space 22, compressed air can be discharged in a position away from the connector. In other words, such a configuration increases the degree of freedom of the position where the connector 42 is installed.

Figure 5:
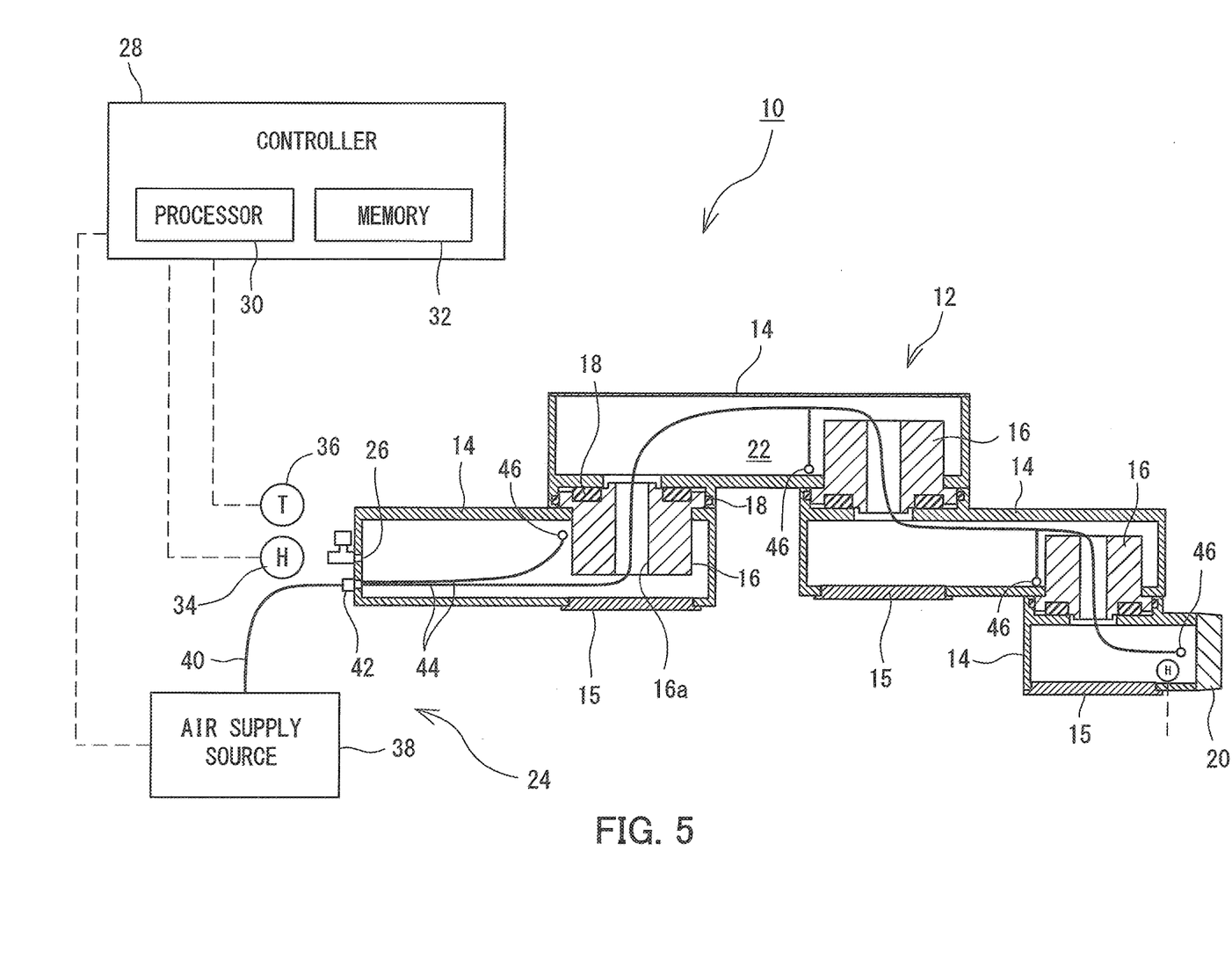
FIG. 5 is a diagram showing an example of another moisture intrusion detection system.

The configuration that has been described so far is merely illustrative. So long as compressed air is supplied to the closed space 22 and the presence or absence of moisture is determined based on the humidity of the ejected air detected by the humidity sensor 34, other configurations may be modified as appropriate. For example, although only one outlet 46 is provided in the description that has been made so far, more than one outlet 46 may be provided. For example, as shown in FIG. 5, the outlets 46 may be provided not only near the distal end of the closed space 22 but also near each joint 16. Such an outlet 46 may be provided at a position away from the air vent passage 26 or in a position where moisture is likely to accumulate. An example of a position where moisture is likely to accumulate is around each joint 16.

The outlets 46 may be provided in the same internal hose 44 or may be provided in different internal hoses 44. When a plurality of outlets 46 are provided, a valve 50 (for example, an electromagnetic valve) may be provided in the closed space 22 so that the outlet 46 to be opened can be switched as needed.

The number of humidity sensors 34 and the number of temperature sensors 36 are also not limited to one and may be plural. For example, as shown in FIG. 5, the humidity sensor 34 may be provided not only near the air vent passage 26 but also near the outlet 46 (that is, in the closed space 22). In this case, the presence or absence of moisture intrusion may be determined based on a comparison between the humidity detected by the humidity sensor 34 near the outlet 46 and the humidity detected by the humidity sensor 34 near the air vent passage 26.

Figure 6:
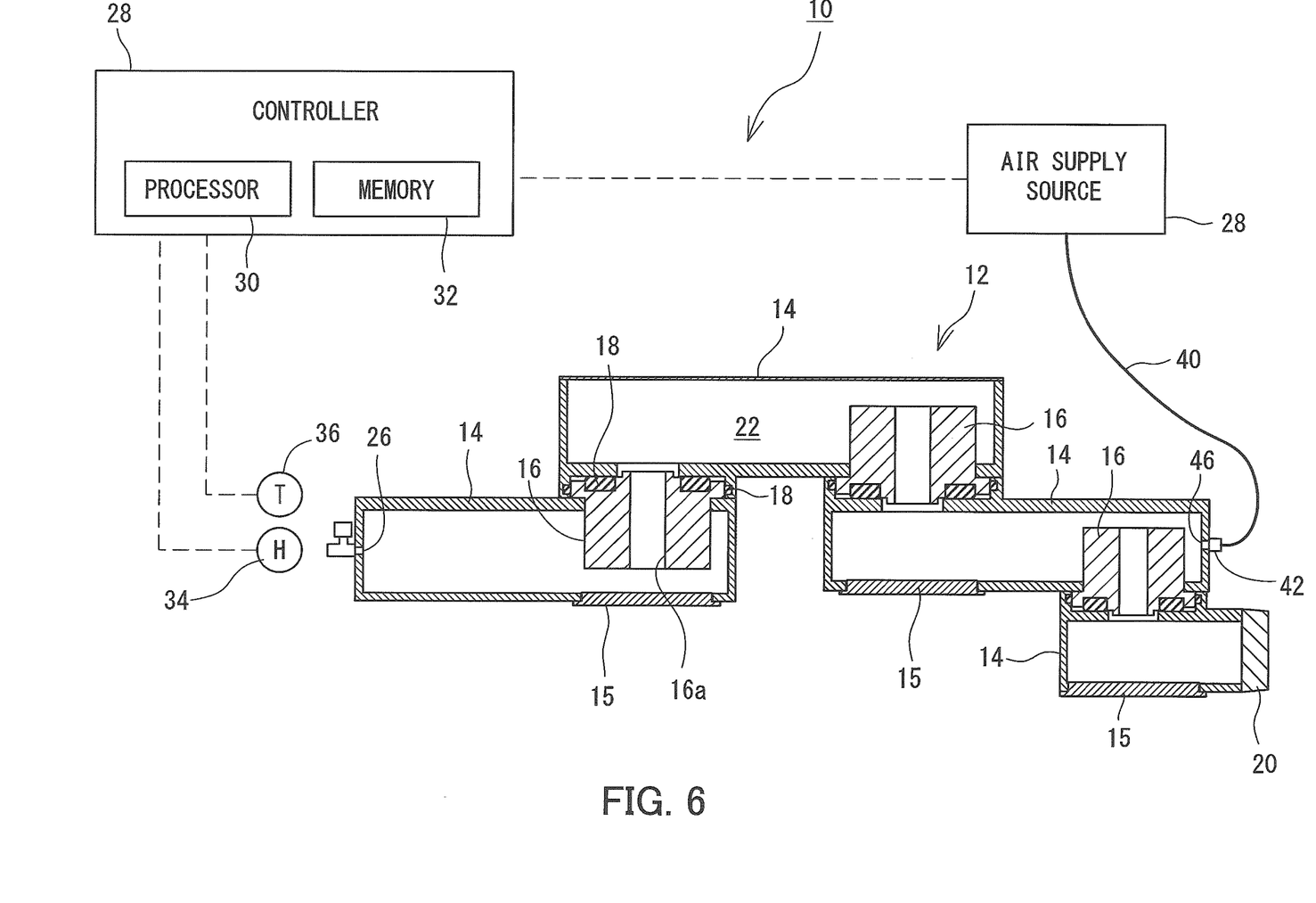
FIG. 6 is a diagram showing an example of still another moisture intrusion detection system.

Although in the above description the internal hose 44 is provided in the closed space 22, the internal hose 44 is not necessarily provided. For example, as shown in FIG. 6, the inner end of the connector 42 may be opened toward the closed space 22 so that compressed air may be directly discharged from the inner end into the closed space 22. In particular, in this case, the inner end of the connector 42 serves as the outlet 46. This configuration eliminates the need to route a hose in the closed space 22. It is therefore not necessary to consider the entanglement or breakage of the hose, so that the configuration can be simplified and the industrial robot 12 can be made more compact.

The invention claimed is:

1. A moisture intrusion detection system comprising:
    an industrial robot that has a closed space defined thereinside;

an air supply mechanism that supplies compressed air to the closed space;

an air vent passage that is provided in the industrial robot to establish communication between an external space outside the industrial robot and the closed space, and guides, to the external space, air ejected from the closed space upon supply of the compressed air;

a humidity sensor that is disposed external to the industrial robot and detects a humidity of ejected air that is ejected from the air vent passage to the external space upon supply of the compressed air; and a controller that determines presence or absence of moisture intruding into the closed space based on a detected humidity of the ejected air, the detected humidity being detected by the humidity sensor, wherein the controller causes the air supply mechanism to continue to supply the compressed air for at least a predetermined reference time, and determines presence or absence of moisture intruding into the closed space according to a detected humidity that is detected at a determination timing after a lapse of at least the reference time from a start of the supply of the compressed air, and the reference time is the time during which the supplied compressed air passes through the closed space and is then output from the air vent passage.

2. The moisture intrusion detection system according to claim 1, wherein the air supply mechanism comprises:

a supply source of the compressed air;

an air hose that communicates with the supply source through which the compressed air flows; and a connector that is provided to the industrial robot and to which the air hose is detachably attached, the connector communicating with the closed space.

3. The moisture intrusion detection system according to claim 2, wherein the air supply mechanism further comprises an internal hose that is disposed in the closed space, has one end connected to the connector, and has one or more outlets that discharge the compressed air to the closed space.

4. The moisture intrusion detection system according to claim 1, wherein the air supply mechanism discharges the compressed air at more than one point in the closed space.

5. A moisture intrusion detection system comprising:

an industrial robot that has a closed space defined thereinside;

an air supply mechanism that supplies compressed air to the closed space;

an air vent passage that is provided in the industrial robot to establish communication between an external space outside the industrial robot and the closed space, and guides, to the external space, air ejected from the closed space upon supply of the compressed air;

a humidity sensor that is disposed external to the industrial robot and detects a humidity of ejected air that is ejected from the air vent passage to the external space upon supply of the compressed air; and a controller that determines presence or absence of moisture intruding into the closed space based on a detected humidity of the ejected air, the detected humidity being detected by the humidity sensor, wherein the industrial robot is a multi-joint robot that includes a plurality of arms coupled via joints and is provided with a mechanical interface having a distal end to which a tool is detachably attachable, and the air supply mechanism discharges the compressed air at at least one of a spot near the joint and a spot near the distal end.

6. The moisture intrusion detection system according to claim 5, wherein the air supply mechanism discharges the compressed air at a spot near the distal end, and the air vent passage is provided near a proximal end of the industrial robot.

7. A moisture intrusion detection method comprising:

supplying compressed air to a closed space provided inside an industrial robot;

detecting, with a humidity sensor disposed external to the industrial robot, a humidity of ejected air that is ejected from an air vent passage upon supply of the compressed air, the air vent passage being provided in the industrial robot; and determining, with a controller, presence or absence of moisture intruding into the closed space, according to the humidity detected by the humidity sensor, wherein the controller causes an air supply mechanism to continue to supply the compressed air for at least a predetermined reference time, and determines presence or absence of moisture intruding into the closed space according to a detected humidity that is detected at a determination timing after a lapse of at least the reference time from a start of the supply of the compressed air, and the reference time is the time during which the supplied compressed air passes through the closed space and is then output from the air vent passage.

8. The moisture intrusion detection system according to claim 1, wherein the compressed air is dry.

9. The moisture intrusion detection method according to claim 7, wherein compressed air is dry.

* * * * *